(12) United States Patent
Alie

(10) Patent No.: US 7,446,559 B2
(45) Date of Patent: Nov. 4, 2008

(54) METHOD AND SYSTEM FOR POWERING AN INTEGRATED CIRCUIT

(75) Inventor: Emmanuel Alie, Sophia Antipolis-Valbonne (FR)

(73) Assignee: NXP B.V., Eindhoven (NL)

( * ) Notice: Subject to any disclaimer, the term of this patent is extended or adjusted under 35 U.S.C. 154(b) by 266 days.

(21) Appl. No.: 10/576,570

(22) PCT Filed: Oct. 18, 2004

(86) PCT No.: PCT/IB2004/003407

§ 371 (c)(1),
(2), (4) Date: Apr. 19, 2006

(87) PCT Pub. No.: WO2005/041007

PCT Pub. Date: May 6, 2005

(65) Prior Publication Data

US 2007/0145986 A1   Jun. 28, 2007

(30) Foreign Application Priority Data

Oct. 22, 2003   (EP) ................................. 03300175

(51) Int. Cl.
H03K 17/16 (2006.01)
G05F 1/10 (2006.01)

(52) U.S. Cl. ........................................ 326/33; 327/540
(58) Field of Classification Search .................. 326/16, 326/31, 33; 327/50, 198, 540
See application file for complete search history.

(56) References Cited

U.S. PATENT DOCUMENTS 5,467,009 A * 11/1995 McGlinchey ............... 323/269
5,672,997 A    9/1997 Shield et al.
6,377,083 B1 * 4/2002 Takabayashi et al. ......... 327/50

* cited by examiner

Primary Examiner—Daniel D Chang
(74) Attorney, Agent, or Firm—Peter Zawilski

(57) ABSTRACT

Consistent with an example embodiment, there is a method is for powering an integrated circuit. An integrated circuit comprises a chip within a package assembly, the chip includes a plurality of logic circuits each having at least one power input which should not receive a power voltage exceeding a predetermined maximum operating voltage. The method comprises measuring a power voltage supplied to the integrated circuit directly within the chip at the power input of at least one logic circuit. The power voltage is regulated such that the voltage supplied to the power input of at least one logic circuit of the chip is equal to the predetermined maximum operating voltage of this logic circuit.

17 Claims, 3 Drawing Sheets

METHOD AND SYSTEM FOR POWERING AN INTEGRATED CIRCUIT

FIELD OF THE INVENTION

The present invention relates to a method and a system for powering an integrated circuit, said integrated circuit comprising a chip within a package assembly, the chip comprising a plurality of logic circuits each having at least one power input which should not receive a power voltage exceeding a predetermined maximum operating voltage.

More precisely, the invention relates to a method of powering an integrated circuit comprising the steps of:
  measuring the power voltage supplied to the integrated circuit, and
  regulating this power voltage in order to keep the difference between the measured voltage and a reference voltage as small as possible.

The invention also relates to an integrated circuit especially designed to be used in the above method.

A known solution for designing a faster integrated circuit that executes operations more rapidly is to build the integrated circuit with faster logic circuits. However, faster logic circuits are bigger than normal logic circuits. So this solution results in integrated circuits of increased size.

Another solution is to increase the power voltage of the integrated circuit. Indeed, the higher the power voltage, the faster the integrated circuit.

However, the power voltage should never exceed a nominal maximum operating voltage, otherwise this may result in the integrated circuit being definitely damaged.

In order to power the integrated circuit with a voltage as close as possible to its nominal maximum operating voltage, power supply systems with active feedback are used.

Such systems are also known as "remote sensing" circuits.

According to typical prior systems, active feedback is used by power supplies to compensate for voltage drops caused by the impedances of the conductors via which power is transmitted to a load, which may be an integrated circuit. A power supply may include circuitry that compensates for such voltage drops by remotely sensing the voltage delivered to the load. The sensed voltage is typically compared with a voltage reference of the power supply. If the voltage at the integrated circuit is different from the voltage reference, the power supply adjusts its output power voltage, either upwards or downwards, until the sensed voltage is equal to the voltage reference.

As a practical matter, the nominal maximum operating voltage for an integrated circuit as specified by the manufacturer of the integrated circuit is typically below the actual maximum operating voltage of the integrated circuit by an operating margin voltage, the maximum operating voltage being the voltage level above which the transistors or logics of an integrated circuit will be damaged. To better ensure continuous operation of the integrated circuit under different operating conditions, the manufacturer of the integrated circuit selects the operating margin voltage by taking into consideration a theoretical minimum voltage drop inside the chip of the integrated circuit and a theoretical minimum voltage drop at the electrical interface with the chip. The value of the operating margin voltage is also selected to account for inaccuracies of the testing equipment that rates the maximum voltage at which the integrated circuit continues to operate.

Voltage drops in the chip of the integrated circuit are often referred to as "on-chip losses" and include voltage drops due to the inherent impedances of the semiconductor material from which the chip was manufactured. On-chip losses can vary for each semiconductor chip manufactured according to the same integrated circuit design. The actual on-chip losses of a particular semiconductor chip may, in fact, be much more than the best-case on-chip losses that are accounted for by the operating margin voltage, which means that the voltage supplied to such a semiconductor chip could be increased above the nominal maximum operating voltage if the actual on-chip losses were known.

Voltage drops at the electrical interface with the chip of the integrated circuit are often referred to as "package losses" and include voltage drops caused by the impedance of the bond wires, the impedance of the package leads, the interface between the bond wires and the semiconductor chip, the interface between the bond wires and the package leads, and the interface between the leads of a package and the printed circuit board. Like on-chip losses, the actual package losses of a particular semiconductor chip may be worst than the best-case package losses that are accounted for by the operating margin voltage, which means that the voltage supplied to such a semiconductor chip could be increased to above the nominal maximum operating voltage if the actual package losses were known.

Therefore, the method using remote sensing and other known methods are not optimal.

SUMMARY OF THE INVENTION

It is accordingly an object of the invention to provide a method to power each integrated circuit with a voltage very close to its actual maximum operating voltage.

With the above and other objects in view, the invention provides a method wherein during the measuring step the power voltage is directly measured within the chip at the power input of at least one of the logic circuits, and wherein the method comprises the step of setting the reference voltage such that the voltage supplied to the power input of at least one logic circuit of the chip is equal to the predetermined maximum operating voltage of this logic circuit.

In the above method, the voltage used to regulate the power voltage supplied to the integrated circuit is directly measured within the chip of the integrated circuit and therefore bypasses at least the package losses. The regulated voltage supplied to the integrated circuit is thus automatically adjusted in upward direction in order to compensate for the actual package losses.

Therefore, the voltage supplied to the integrated circuit according to the above method is higher than the one supplied according to the known method, and the integrated circuit will operate at higher speed than previously.

The features as defined in claims 2 to 3 have the advantage that the method also compensates for the on-chip losses.

The features as defined in claim 4 have the advantage that the method can be used with existing integrated circuits.

Other features of the claimed invention are recited in the dependent claims.

The invention also relates to a system for powering an integrated circuit by the above method.

The invention also relate to an integrated circuit especially designed to be powered by the above method and having a sensing point at the power input of the first logic circuit that will be damaged in the case of a voltage increase over and above the predetermined maximum operating voltage of this logic circuit.

DESCRIPTION OF THE PREFERRED EMBODIMENTS

Figure 1:
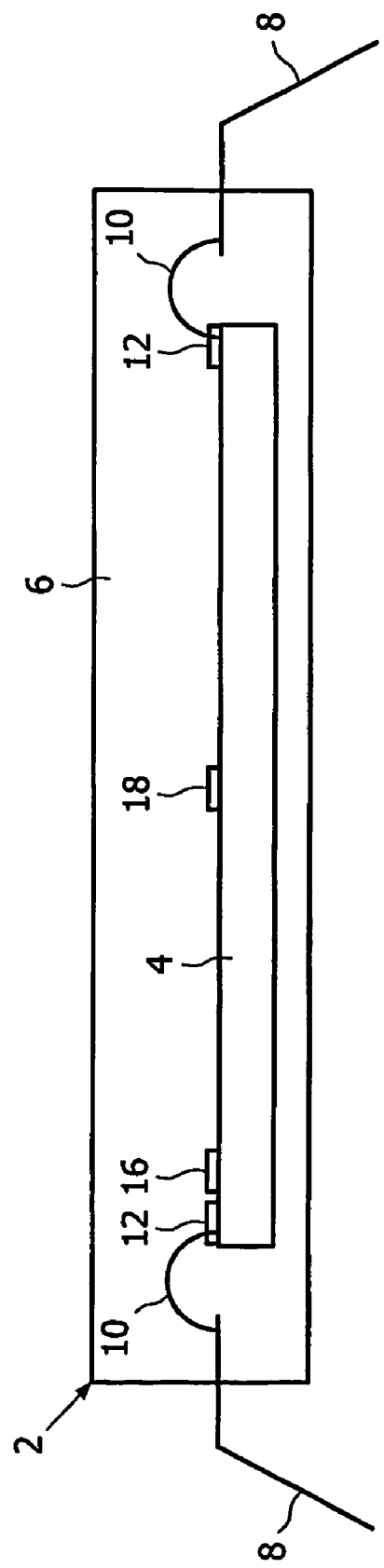
FIG. 1 is a cross-section of an integrated circuit.

FIG. 1 shows a cross-section of an integrated circuit 2. This integrated circuit may be a microprocessor, a memory circuit, or the like.

Integrated circuit 2 comprises a semiconductor chip 4 within a package assembly 6.

Semiconductor chip 4 is connected to package leads 8 via bond wires 10. Each bond wire is connected at one end to one package lead 8 and at the other end to a bond pad 12.

Here, bond pads 12 are intended to receive a voltage supplied by a power supply through the package leads 8.

Chip 4 comprises a large number of logic circuits. Each logic circuit has a positive power input, which is connected to pad 12 through conductor tracks in order to be supplied with a positive voltage.

Hereinafter, the term "logic circuit" will be understood to refer to any logic device or circuit which, when implemented at the transistor level, includes at least a positive power input. Such a logic circuit may be, for example, a logic gate such as an OR gate, AND gate, NOR gate, NAND gate, . . . etc, or an N channel or P channel transistor.

To simplify FIG. 1, only two logic circuits 16 and 18 which are connected to pad 12 via conductor tracks 20 and 22 (FIG. 2), respectively, are represented.

Figure 2:
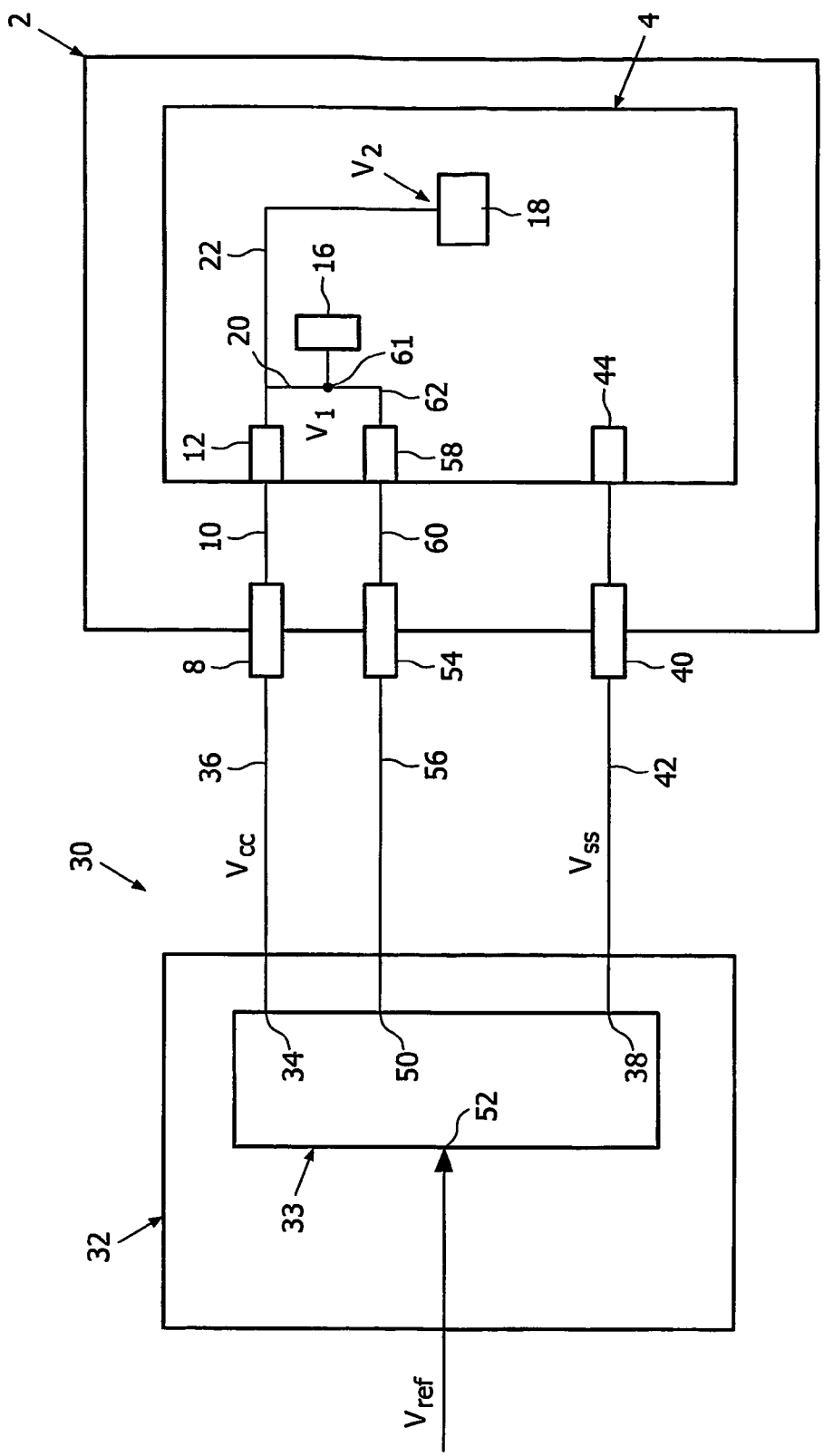
FIG. 2 is a schematic diagram of a system for remote sensing according to the invention.

FIG. 2 shows a remote sensing system 30 that comprises a power supply 32 with a regulating circuitry 33, which is connected to integrated circuit 2. Elements of integrated circuit 2 that have already been described with reference to FIG. 1 have been given with the same references numerals.

Power supply 32 includes a $V_{CC}$ output pin 34, which supplies the power voltage $V_{CC}$ to lead 8 via a supply line 36.

Power supply 32 also includes a $V_{SS}$ output pin which supplies a system ground voltage $V_{SS}$ to a package lead 40 of integrated circuit 2 via a ground line 42. Package lead 40 is connected via one bond wire to a bond pad 44 to which the ground input voltage of each logic circuit is connected.

Power supply 32 also includes a sensing input pin 50 and a $V_{ref}$ input pin 52.

Input pin 50 is connected to a sensing package lead 54 of the integrated circuit 2 via an input line 56.

Sensing lead 54 is connected to a bond pad 58 of the chip 4 via a bond wire 60. Bond pad 58 is connected to a sensing point 61 via a conductor track 62. Sensing point 61 is placed within chip 4 at the power input of the logic circuit which is known to be the first to be damaged in the case of a power voltage increase. This will be explained in more details with reference to FIG. 3.

The input impedance of input pin 50 is very high, so the conduction path from sensing line 56 to sensing pin 50 appears to be an open circuit, and little or no current flows through sensing line 56. Therefore, there are virtually no on-chip or package losses due to the impedance of bond wire 60 and track 62.

Pin 52 is connected to a constant reference voltage $V_{ref}$. Reference voltage $V_{ref}$ is set to be equal to the predetermined maximum operating voltage of logic circuit 16. The predetermined maximum operating voltage of a logic circuit is determined by the manufacturer during the design process of chip 4. Typically, the predetermined maximum operating voltage of a logic circuit is higher than the nominal maximum operating voltage of the integrated circuit 2 since on-chip losses and package losses are not taken into consideration for its determination.

The way in which the remote sensing system 30 is designed and works will now be explained with reference to FIG. 3 in the particular case in which all logic circuits of chip 4 have a same predetermined maximum operating voltage equal to 1.2V.

During design, in step 80, of the integrated circuit 2, a conductor track is routed from each power input of each logic circuit to bond pad 12. The impedances of these tracks are not the same. Indeed, for example, the impedance of track 22 will be higher that the impedance of track 20 since track 22 is longer than track 20. Therefore, the voltage $V_1$ at the power input of logic circuit 16 will be higher than the voltage $V_2$ at the power input of logic circuit 18. Therefore, sensing point 61 is placed within chip 4 at the power input of the logic circuit associated with the lowest on-chip losses. In other words, this corresponds here to the power input of the logic circuit which is designed to be supplied with the highest power voltage. Typically, the shortest power supply tracks are the ones that connect logic circuits near the external periphery of chip 4 to pad 12.

Sensing point 61 is placed here, for example, at the power input of logic circuit 16 in an operation 82.

Then conductor track 62 is routed in an operation 84 between sensing point 61 and sensing pad 58, and sensing pad 58 is connected to sensing lead 54 via bond wire 60 in an operation 86

In a step 88 for assembling the remote sensing system 30, sensing lead 54 is connected to input pin 50 in an operation 90.

Then the value of voltage reference $V_{ref}$ of regulating circuitry 33 is set to be equal to the predetermined maximum operating voltage of logic circuit 16 in an operation 92.

Once system 30 has been assembled, it works as follows.

At power on, the voltage $V_{CC}$ supplied to lead 8 is low, and below the predetermined maximum operating voltage of each of the logic circuits of the integrated circuit 2.

Then the regulating circuit 33 regulates the voltage $V_{CC}$ in step 96 to be equal to reference voltage $V_{ref}$.

More precisely, the regulating circuitry measures the value of the voltage $V_1$ at sensing point 61 in an operation 98.

Then the measured voltage value is compared with the value of the reference voltage $V_{ref}$ in an operation 100.

If the measured voltage $V_1$ is lower than the reference voltage $V_{ref}$, then voltage $V_{CC}$ is increased in step 102.

Otherwise, the regulating circuitry 33 maintains or decreases voltage $V_{CC}$ in an operation 104.

After operation 102 or 104, the regulating circuitry 33 returns to operation 98 in order to continuously regulate the voltage $V_{CC}$ supplied to integrated circuit 2.

Since integrated circuit 2 in system 30, is powered at the predetermined maximum operating voltage of logic circuit 16, all logic circuits are operated at the maximum possible speed, and integrated circuit 2 operates faster than with known methods.

As an alternative, integrated circuit 2 may be replaced by the integrated circuit described in U.S. Pat. No. 5,672,997. The integrated circuit disclosed in this document presents a sensing lead connected to a sensing point within the chip in order to measure the lowest power voltage within the chip of the integrated circuit.

Figure 3:
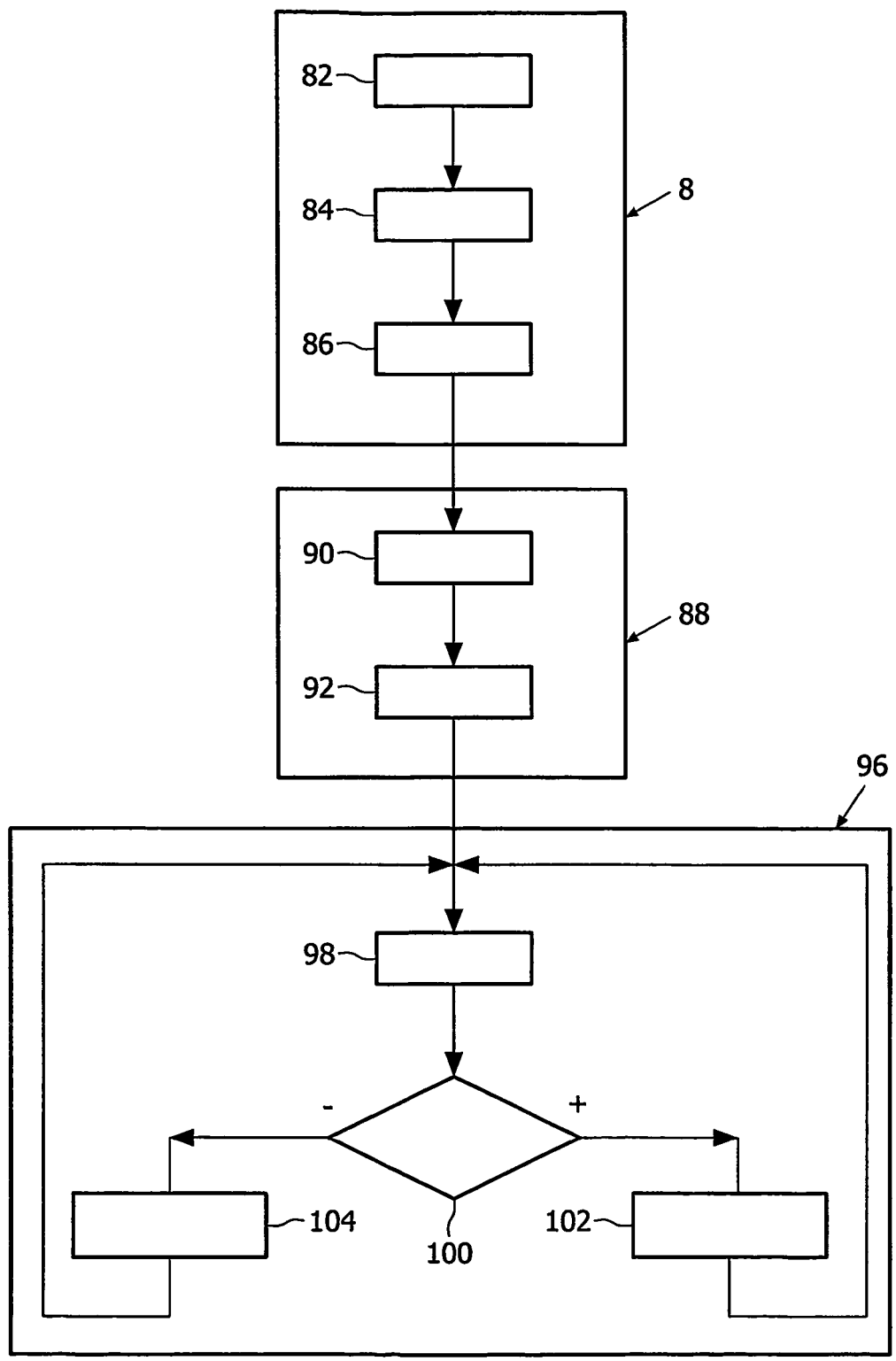
FIG. 3 is a flowchart of a method of powering an integrated circuit according to the invention.

If such an integrated circuit is used, operation 92 in FIG. 3 is replaced by two operations. The first one consists in establishing the value of the voltage drop caused by the on-chip losses between the sensing point and the power input of the logic circuit which is known to be the first to be damaged in the case of a power voltage increase. For example, if the sensing point is placed at the power input of logic circuit 18, and the first logic circuit to be damaged is logic circuit 16, the voltage drop between voltages $V_2$ and $V_1$ is determined. Here, this voltage drop is assumed to be equal to 0.1V.

The second operation consists in setting the value of reference voltage $V_{ref}$ to be equal to the predetermined maximum operating voltage of logic circuit 16 minus the previously determined voltage drop. Therefore, according to this alternative embodiment, the value of voltage $V_{ref}$ is set to 1.1V.

This alternative embodiment has the advantage that it uses the same sensing lead as the one eventually used to minimize the power supply of such an integrated circuit. However, the voltage drop between voltages $V_2$ and $V_1$ cannot be established with a very high accuracy. So any speed increase achieved with such an integrated circuit is not as good as with the integrated circuit 2 of the main embodiment.

Depending on the accuracy of regulating step 96, the value of the reference voltage $V_{ref}$ may be set to be equal to a value below the predetermined maximum operating voltage of logic circuit 16 by an operating margin voltage in order always to remain below this predetermined maximum operating voltage established during the design of the integrated circuit design.

The invention claimed is:

1. A method of powering an integrated circuit, said integrated circuit comprising a chip within a package assembly, said chip comprising a plurality of logic circuits, each of the logic circuits having at least one power input which should not receive a power voltage exceeding a predetermined maximum operating voltage, the method comprising the steps of:
   measuring the power voltage supplied to the integrated circuit, and
   regulating this power voltage in order to keep the difference between the measured voltage and a reference voltage as small as possible,
   wherein during the measuring step the power voltage is directly measured within the chip at the power input of at least one of the logic circuits, and
   wherein the method comprises the step of setting the reference voltage such that the voltage supplied to the power input of at least one logic circuit of the chip is equal to the predetermined maximum operating voltage of this logic circuit.

2. The method according to claim 1, wherein during the measuring step the power voltage is measured within the chip directly at the power input of the logic circuit known to be the first to be damaged in the case of a power voltage increase on at least one power input lead of the integrated circuit.

3. The method according to claim 2, wherein during the measuring the power voltage is measured within the chip directly at the power input of the logic circuit known to be supplied with the highest power voltage available within the chip.

4. The method according to claim 1, wherein, during the measuring step the power voltage is measured within the chip directly at the power input of a first logic circuit, and wherein during the setting step, the reference voltage is set to the value of the predetermined maximum operating voltage of a second logic circuit known to be the first to be damaged in the case of a power voltage increase on at least one power input lead of the integrated circuit minus a margin voltage representative of a voltage drop between the power inputs of the first and second logic circuits.

5. A powering system comprising:
   an integrated circuit comprising a chip within a package assembly, said chip comprising a plurality of logic circuits, each of the logic circuits having at least one power input which should not receive a power voltage exceeding a predetermined maximum operating voltage, and the package comprising at least one power input lead,
   a power supply to supply a power voltage to said at least one power input lead, said power supply being able to regulate the power voltage supplied in dependence on the difference between a reference voltage and a voltage measured at a sensing point,
   wherein the sensing point is located within the chip of the integrated circuit at the power input of one of the logic circuits, and
   wherein the reference voltage is set so as to supply to the power input of at least one logic circuit a voltage equal to the predetermined maximum operating voltage of this logic circuit.

6. The system according to claim 5, wherein the sensing point is located at the power input of the logic circuit known to be the first to be damaged in the case of a power voltage increase on said at least one power input lead.

7. An integrated circuit comprising,
   a chip within a package assembly, said chip comprising a plurality of logic circuits, each of the logic circuits having at least one power input which should not receive a power voltage exceeding a predetermined maximum operating voltage, the package assembly being provided with a plurality of leads to be connected to an external circuit board, one of these leads being a sensing lead to measure the voltage directly at a sensing point within the chip and another lead being a power input lead, wherein the sensing point is located at the power input of the logic circuit known to be the first to be damaged in the case of a power voltage increase on the power input lead.

8. The system according to claim 5, wherein the chip includes a power input pad and the power input of each of the logic circuits is connected to the power input pad by a respective track, each track having an impedance, and wherein the sensing point is located at the power input of the logic circuit that is connected to the power input pad by the track having the lowest impedance.

9. The system according to claim 5, wherein the chip includes a power input pad and the power input of each of the logic circuits is connected to the power input pad by a respective track, each track having a length, and wherein the sensing point is located at the power input of the logic circuit that is connected to the power input pad by the track having the shortest length.

10. The system according to claim 5, further comprising a comparator that determines the difference between the reference voltage and the voltage measured at the sensing point, the comparator located external to the integrated circuit.

11. The system according to claim 5, wherein the sensing point is located at the power input of the logic circuit known to be supplied with the highest power voltage available within the chip.

12. The method according to claim 1, wherein the chip includes a power input pad and the power input of each of the logic circuits is connected to the power input pad by a respective track, each track having an impedance, and wherein the power voltage is measured at the power input of the logic circuit that is connected to the power input pad by the track having the lowest impedance.

13. The method according to claim 1, wherein the chip includes a power input pad and the power input of each of the logic circuits is connected to the power input pad by a respective track, each track having a length, and wherein the power voltage is measured at the power input of the logic circuit that is connected to the power input pad by the track having the shortest length.

14. The method according to claim 4, wherein the chip includes a power input pad and the power input of each of the logic circuits is connected to the power input pad by a respective track, each track having an impedance, and wherein the power input of the second logic circuit is connected to the power input pad by the track having the lowest impedance.

15. The method according to claim 4, wherein the chip includes a power input pad and the power input of each of the logic circuits is connected to the power input pad by a respective track, each track having a length, and wherein the power input of the second logic circuit is connected to the power input pad by the track having the shortest length.

16. The method according to claim 4, further comprising determining the difference between the reference voltage and the measured voltage using a comparator that is located external to the integrated circuit.

17. The method according to claim 4, wherein the power input of the second logic circuit is supplied with the highest power voltage available within the chip.

* * * * *